June 14, 1960     A. Y. DODGE     2,940,567
ONE-WAY CLUTCHES
Original Filed June 6, 1951     2 Sheets-Sheet 1
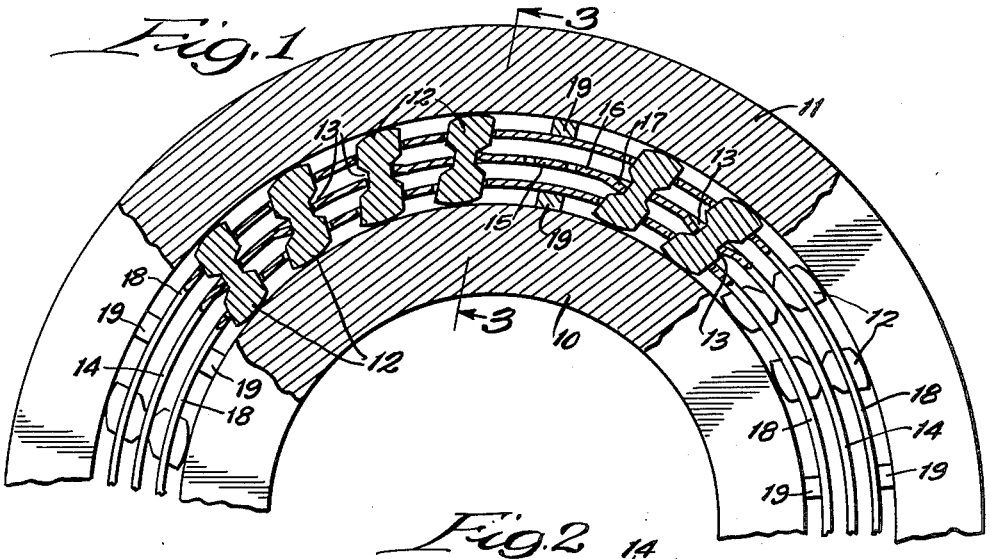
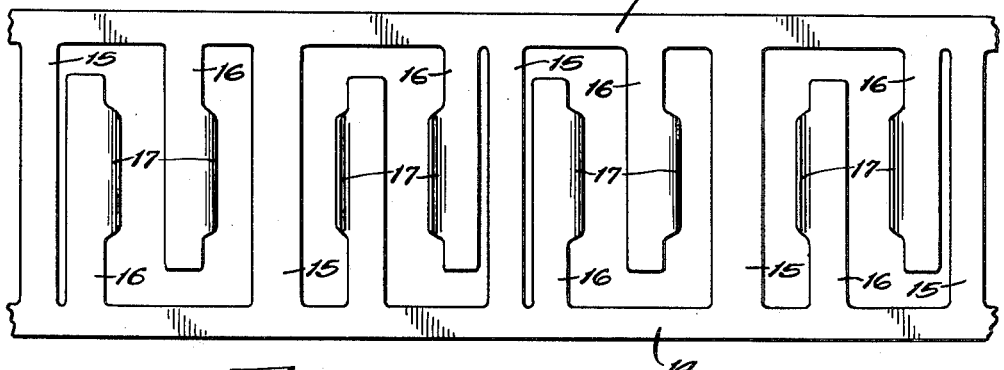
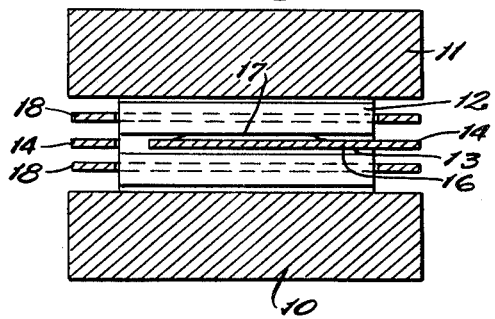
INVENTOR:
Adiel Y. Dodge,
BY
E. A. Booth
ATTORNEY.

June 14, 1960   A. Y. DODGE   2,940,567
ONE-WAY CLUTCHES
Original Filed June 6, 1951   2 Sheets-Sheet 2
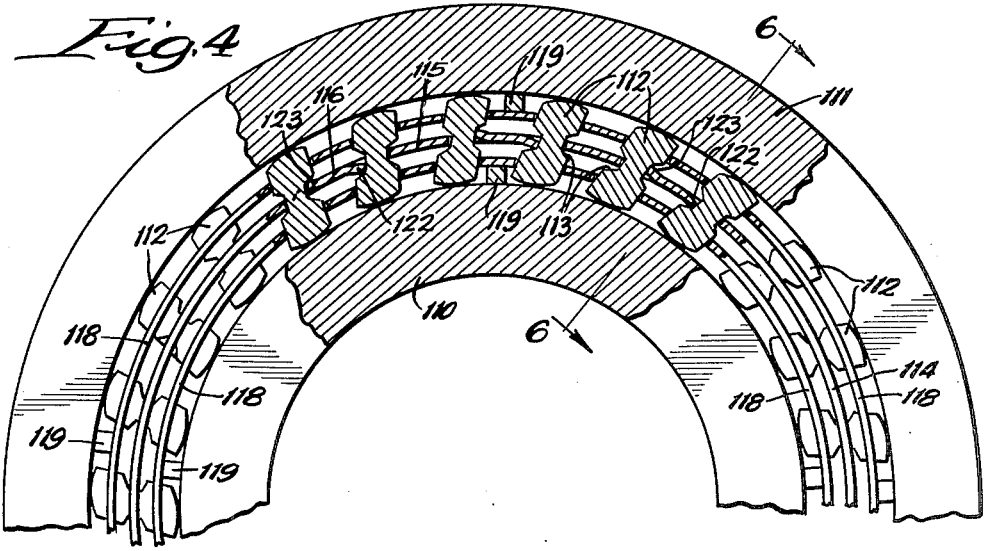
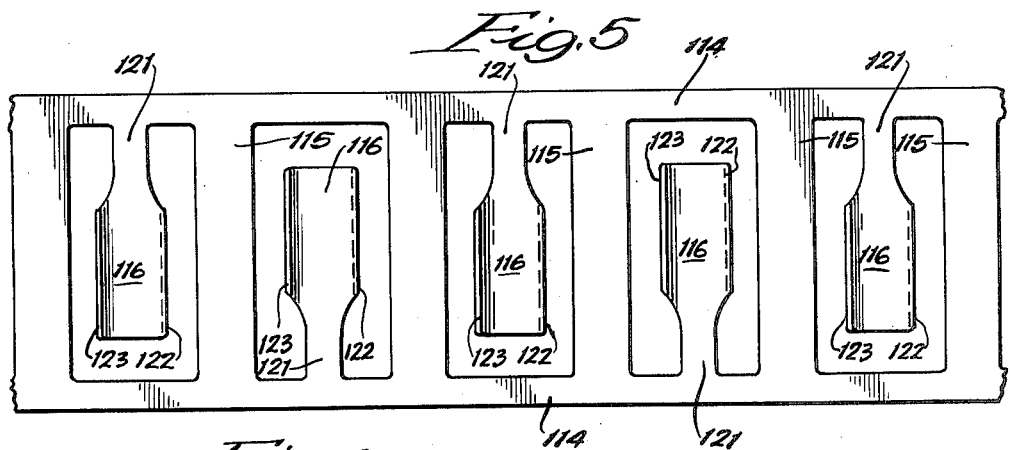
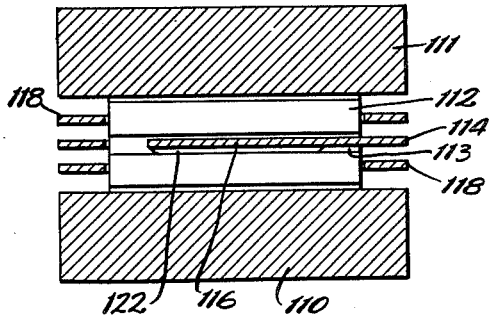
INVENTOR:
Adiel Y. Dodge,
BY
E. S. Booth,
ATTORNEY.

United States Patent Office 2,940,567
Patented June 14, 1960

2,940,567

ONE-WAY CLUTCHES

Adiel Y. Dodge, Rockford, Ill., assignor to Borg-Warner Corporation, a corporation of Illinois Continuation of application Ser. No. 230,194, June 6, 1951. This application Mar. 20, 1956, Ser. No. 572,775

9 Claims. (Cl. 192—45.1)

This invention relates to one-way clutches, and more particularly to a cage to control spring construction for one-way clutches of the tilting gripper type.

It is desirable in tilting gripper type clutches to provide a cage structure to hold the grippers properly spaced and positioned, and also to provide spring means to urge the grippers to tilt toward their engaged position. It is one of the objects of the present invention to provide a one-way clutch in which the spring means constitutes an integral part of a cage member which is preferably formed of sheet metal or the like.

Another object is to provide a one-way clutch in which the cage member is constructed to provide a relatively low spring rate acting on the grippers to tilt them.

Still another object is to provide a one-way clutch in which all of the grippers are urged to tilt in the same direction with some of the grippers being urged radially inward toward the inner race and others being urged radially outward toward the outer race.

According to one feature of the invention, the cage member is formed of an annular strip of metal with at least one side ring and with integral resilient arms projecting axially from the side ring to engage in groove in the gripper faces. The arms are resilient radially to act as relatively low rate springs urging the grippers to tilt. Preferably some of the arms engage grooves in one face of the grippers to urge them inward, and others of the arms engage grooves in the opposite face of others of the grippers to urge them outward.

According to another feature of the invention, the cage member includes two side rings connected by cross bars which engage grooves in the gripper faces to hold the grippers in place and to assist in controlling tilting thereof.

A further object of the invention is to provide a one-way clutch in which the grippers are connected for simultaneous tilting by cage rings engaging the grippers adjacent their ends and held centered by spacer blocks which slidably engage the races.

The above and other objects and features of the invention will be more readily apparent from the following description when read in connection with the accompanying drawings in which Figure 1 is a partial side elevation with parts in section of a one-way clutch embodying the invention;

Figure 2 is a developed view of the cage ring;

Figure 3 is a section on the line 3—3 of Figure 1;

Figure 4 is a view similar to Figure 1 illustrating an alternative construction;

Figure 5 is a developed view of the cage of Figure 4, and

Figure 6 is a section on the line 6—6 of Figure 4.

The clutch construction as shown in Figures 1, 2 and 3 includes an inner race 10 having an outer cylindrical surface and an outer race 11 having an inner cylindrical surface coaxial with and spaced from the outer surface of the race 10. Between the adjacent race surfaces a series of tiltable grippers 12 is mounted with the grippers lying in annular array. Each of the grippers includes flat opposite faces connected by arcuately curved ends which are formed on substantially the same radius about circumferentially spaced centers.

With this construction when the grippers tilt counter-clockwise they will bind against the race surfaces to connect the races, and when they tilt clockwise, they will disengage the race surfaces to permit relative rotation thereof. Thus the outer race can turn clockwise relative to the inner race but is held against counter-clockwise rotation.

The grippers are connected by a cage construction including a cage member which engages and tends to tilt them to their engaged position. For this purpose each of the grippers is formed in its opposite faces with axially extending grooves 13. A cage member formed of an annular strip of sheet metal as best seen in Figure 2, is provided to fit over the grippers and to engage in the grooves 13 thereof to hold the grippers assembled and to exert a tilting force thereon.

The cage member is provided with relatively narrow edge portions 14 which form side rings overlying the ends of the grippers as best seen in Figure 3, and which are connected by integral cross bars 15 extending across between the grippers. Between adjacent cross bars the cage member is formed with integral axially extending arms 16 between which the grippers fit. Preferably as shown, the arms extend alternately from the side rings 14 and are provided at one edge with projecting nose portions 17 to fit into the grooves in the grippers.

In the construction illustrated, the arms 16 lie in pairs between adjacent cross bars 15 with one arm of each pair arranged close to one of the cross bars and with the other arm spaced from the adjacent cross bar a sufficient distance to accommodate a gripper. Preferably adjacent pairs of arms are arranged with their nose portions 17 facing in opposite directions. The nose portions 17 on one pair of arms is bent downwardly as best seen in Figure 1, while the nose portions 17 on an adjacent pair of arms is bent upwardly.

The grippers are assembled with one gripper lying between the arms of each pair and a second gripper lying between the nose piece of one of the arms and the adjacent cross bar. The last named gripper will have the groove in one of its faces fitting over the cross bar and the remaining grooves in the faces of the grippers receive the edges of the arms.

With this arrangement as seen in Figure 1, the nose pieces on one pair of arms 16 will tend to press downwardly on the adjacent face of the adjacent gripper to urge its against the inner race and to tilt its counter-clockwise toward its engaged position. The intermediate arm 16 which has a gripper on each side of it will engage one gripper at one of its edges and another gripper at its other edge or with its nose piece.

The nose piece being turned downwardly urged the second gripper inward and tends to tilt it while the first edge acts as a support for the side of the first gripper opposite to the first arm. The arms being formed of sheet metal integral with the rings, are resilient to yield radially and also to yield in twist so that they will accommodate substantial movement of the grippers. Since the arms are relatively long and also because the side rings themselves will yield to act as springs, a low spring rate is obtained which will exert a substantially constant force on the grippers throughout their full range of movement.

The grippers engaged by the next adjacent pair of arms are urged radially outward toward the outer race and are also urged to tilt in a counter-clockwise direction toward their engaged position. In this way light frictional engagement is maintained with both races during overrunning so that upon a reversal of torque the grippers will engage rapidly and uniformly with the races.

To protect the spring cage and to insure that all of the grippers will tilt together, cage rings are preferably provided engaging the end portions of the grippers. Two such rings are shown in Figures 1 and 3 although either ring or both rings could be omitted if desired. Each of the cage rings comprises an annular strip of sheet metal or the like 18, which is pierced to form openings receiving the end portions of the grippers. Preferably a slight clearance is provided to insure against binding and to permit slight individual action of the grippers.

The cage rings may lie adjacent the races or they may be provided with spacers 19 as shown to hold the cage rings properly positioned. The spacer blocks 19 are secured to the faces of the cage rings and slidably engaging the adjacent race surface. The spacer blocks are of such a size that they will engage the race surfaces lightly with a relatively small friction but will still hold the cage rings accurately centered so that they will control the grippers properly. These cage rings not only insure simultaneous movement of all of the grippers but also through their slight frictional engagement with the races, assist in controlling the tilting action of the grippers.

The cage rings and spring member also function to prevent cocking of the grippers to a position at an angle to the axis of the races. The openings in the cage rings are formed with straight edges which engage the flat faces of the grippers and the grippers are always urged against at least one of such edges by the spring arms. Further, one side of the grippers always engages a straight edge on the spring member against which it is urged by the spring action. In this way cocking of the grippers is effectively resisted so that the grippers are retained in proper working condition.

The construction shown in Figures 4, 5 and 6 is identical to that of Figures 1, 2 and 3 except for the construction of the resilient cage member and parts therein corresponding to like parts in Figures 1, 2 and 3 are indicated, by the same reference numerals plus 100.

In this construction the resilient cage member is formed of an annular strip of sheet metal pierced to provide relatively narrow side rings 114 to overlie the ends of the grippers and which are connected by cross bars 115. A single resilient arm 116 extends axially between each pair of cross bars 115, the arms preferably extending alternately from one side ring and then the other.

Each of the arms 116 has a relatively narrow elongated portion 121 connecting it to one of the side rings and a wider central portion which is bent downwardly at one edge 122 and upwardly at its opposite edge 123. The spaces between the edges of the cross bars and the adjacent edges of the arms are sufficient in each instance to accommodate a gripper. The grippers are assembled in the spaces with the groove 113 in one face of each gripper engaging the cross bar and with the groove in its opposite face engaging one of the edges 122 or 123 of a resilient arm.

The arms in this construction function almost entirely through their resilience in twisting due to the relatively narrow connecting portion 121 and to the resilience of the side rings. When assembled, the downwardly turned edge 122 of each arm will engage the adjacent face of a gripper to urge it radially inward toward the inner race and will tend to tilt it counter-clockwise toward its engaged position. At the same time the outwardly turned edge 123 of each arm will tend to urge the gripper it engages radially outward and will tend to turn its counter-clockwise. This construction operates in substantially the same manner as that of Figures 1 to 3.

It will be noted that both of the constructions illustrated are extremely simple and inexpensive to manufacture and will serve both to hold the grippers in properly assembled position and to urge them to tilt in their engaging direction. In both cases, the cage members are formed entirely of strips of sheet metal or the like, which can be formed in continuous strips and cut to the required length for a clutch assembly. The ends of the strips can be joined by welding or can simply be abutted or overlapped in assembled position. In both constructions, the arms which provide the resilient force are relatively long so that they function with a low spring rate and exert a more nearly constant force on the grippers in all positions.

This application is a continuation of my copending prior application Serial No. 230,194, filed June 6, 1951, now abandoned.

While two embodiments of the invention have been shown and described in detail, it will be understood that these are illustrative only and are not to be taken as a definition of the scope of the invention, reference being made for this purpose to the appended claims.

What is claimed is:

1. A one-way clutch comprising a series of tiltable grippers adapted to be mounted between concentric races, a cage member including a pair of side rings to overlie the opposite ends of the grippers and joined by cross strips lying between adjacent grippers, and resilient arms extending axially inward alternately from each of said pair of side rings, the grippers being formed with grooves in their faces embracing the edges of the cross bars and the arms being resiliently biased radially to urge the grippers to tilt in one direction.

2. A one-way clutch comprising a pair of coaxial cylindrical races, a series of tiltable grippers in annular array between the races, a pair of annular cage rings formed with openings through which the grippers extend and radially spaced, one radially within and the other radially without the centers of the grippers, spacers on the cage rings slidably engaging the races respectively to hold the cage rings centered, an annular cage member lying between the cage rings including an annular side ring overlying the ends of the grippers, and resilient arms extending axially from the side ring and engaging the grippers to urge them to tilt in one direction.

3. A one-way clutch comprising a series of tiltable grippers adapted to be mounted between concentric races, a cage ring including annular side rings overlying the ends of the grippers and cross members connecting the side rings and extending between adjacent grippers to hold the grippers spaced, parts on the cage ring slidably to engage one of the races to hold the cage centered between the races, and an annular cage member spaced radially from the cage ring and including an annular side ring overlying the ends of the grippers and a plurality of resilient arms secured at one end to and extending from the side rings between adjacent pairs of grippers respectively, the arms including radially flexible parts spaced from the side ring engaging the faces of the grippers resiliently to urge them to tilt in one direction.

4. A one-way clutch comprising a series of tiltable grippers adapted to be mounted between concentric races, a cage ring including annular side rings overlying the ends of the grippers and cross members connecting the side rings and extending between adjacent grippers to hold the grippers spaced, parts on the cage ring slidably to engage one of the races to hold the cage centered between the races, the grippers being formed with grooves in their faces, and an annular cage member lying radially at one side of the cage ring and including an annular side ring overlying the ends of the grippers and resilient arms extending axially from the side ring and having parts thereon fitting into the grooves, said parts being biased radially to resiliently urge the grippers to tilt in one direction.

5. A one-way clutch comprising a series of tiltable grippers adapted to be mounted between concentric races, a pair of concentric radially spaced cage rings each having annular side rings overlying the ends of the grippers and cross members connecting the side rings and extending between adjacent grippers, parts on the inner and outer cage rings slidably to engage the inner and outer races respectively to hold the cage rings centered relative to the races, and an annular spring member lying radially between the cage rings including an annular side ring overlying the ends of the grippers and a plurality of arms secured at one end to and extending from the side ring between adjacent grippers, the arms including radially flexible portions spaced from the side rings and engaging the faces of the grippers to urge the grippers to tilt in one direction.

6. A one-way clutch comprising a series of tiltable grippers adapted to be mounted between concentric races, a pair of concentric radially spaced cage rings each having annular side rings overlying the ends of the grippers and across members connecting the side rings and extending between adjacent grippers, parts on the inner and outer cage rings slidably to engage the inner and outer races respectively to hold the cage rings centered relative to the races, and an annular spring member of sheet material lying between the cage rings including a pair of annular side rings overlying the opposite ends of the grippers, cross strips integral with and connecting the side rings and extending between adjacent grippers, the grippers being formed with grooves in their faces, one of the grooves in each gripper loosely embracing the adjacent edge of a cross bar, and a resilient strip integral with the spring member extending into the groove in the opposite face of each gripper and biased radially to resiliently urge the gripper to tilt in one direction.

7. A one-way clutch comprising a series of tiltable grippers adapted to be mounted between concentric races, a pair of concentric radially spaced cage rings each having annular side rings overlying the ends of the grippers and cross members connecting the side rings and extending between adjacent grippers, parts on the cage rings slidably to engage the races respectively to hold the cage rings centered relative to the races, and an annular spring member lying radially between the cage rings and formed of an annular strip of resilient sheet material having an annular side ring overlying the ends of the grippers and a plurality of axially extending arms secured at one end to and extending from the side ring between adjacent grippers with the other end of said arms being free, the arms including integral circumferentially extending portions engaging the grippers and urging them to tilt in one direction, the arms and circumferentially extending portions being yieldable in twist to permit limited relative circumferential movement of the grippers.

8. A one-way clutch comprising a series of tiltable grippers adapted to be mounted between concentric races, a pair of concentric radially spaced cage rings each having annular side rings overlying the ends of the grippers and cross members connecting the side rings and extending between adjacent grippers, parts on the cage rings slidably to engage the races respectively to hold the cage rings centered relative to the races, and an annular spring member lying radially between the cage rings and formed of an annular strip of resilient sheet material having an annular side ring overlying the ends of the grippers and a plurality of axially extending arms secured at one end to and extending from the side ring between adjacent grippers with the other end of said arms being free, the arms including integral circumferentially extending portions engaging the grippers and urging them to tilt in one direction, the grippers and cross members having axially straight engaging surfaces and the spring member tending to urge the grippers against certain of said surfaces to hold the grippers parallel to the axis of the races.

9. A one-way clutch comprising a series of tiltable grippers adapted to be mounted between concentric races, a pair of concentric, radially spaced cage rings each having annular side rings overlying the ends of the grippers and cross members connecting the side rings and extending between adjacent grippers, spacer blocks carried on at least one of said cage rings slidably in engagement with the adjacent race surface, and an annular spring member lying radially between the cage rings and formed of an annular strip of resilient sheet material having an annular side ring overlying the ends of the grippers and a plurality of axially extending means extending from the side ring and engaging the grippers to urge the grippers to tilt in one direction.

References Cited in the file of this patent

UNITED STATES PATENTS

| | | |
|---|---|---|
| 2,113,722 | Dodge | Apr. 12, 1938 |
| 2,399,749 | Lund | May 7, 1946 |
| 2,630,896 | Dodge | Mar. 10, 1953 |
| 2,638,195 | Tribbetts | May 12, 1953 |
| 2,683,510 | Troendly | July 13, 1954 |